United States Patent [19]

Morita et al.

[11] Patent Number: 5,058,057
[45] Date of Patent: Oct. 15, 1991

[54] LINK CONTROL SYSTEM COMMUNICATING BETWEEN TERMINALS

[75] Inventors: Sadao Morita, Fujisawa; Haruo Shimasaki, Chigasaki; Kiyohiko Tsutsumi, Isehara, all of Japan

[73] Assignee: NCR Corporation, Dayton, Ohio

[21] Appl. No.: 316,270

[22] Filed: Feb. 27, 1989

[30] Foreign Application Priority Data

Mar. 25, 1988 [JP] Japan .................. 63-69963

[51] Int. Cl.⁵ .............. G06F 13/36; G06F 13/26; G06F 11/20
[52] U.S. Cl. .................. 364/900; 364/918.5; 364/933.9; 364/926.9; 364/926.91; 364/926.93; 364/935.2; 364/935.41
[58] Field of Search ... 364/200 MS File, 900 MS File; 370/85.2, 85.6; 340/825; 371/8.1, 8.2, 11.1

[56] References Cited

U.S. PATENT DOCUMENTS

| | | | |
|---|---|---|---|
| 3,886,524 | 5/1975 | Appelt | 364/200 |
| 4,320,467 | 3/1982 | Glass | 364/900 |
| 4,366,653 | 12/1982 | Cedolin et al. | 364/200 |
| 4,456,956 | 6/1984 | El-Gohary et al. | 364/200 |
| 4,468,750 | 8/1984 | Chamoff et al. | 364/900 |
| 4,502,120 | 2/1985 | Ohnishi et al. | 364/405 |
| 4,596,012 | 6/1986 | Reed | 370/85 |
| 4,626,844 | 12/1986 | Mann et al. | 340/825.31 |
| 4,817,091 | 3/1989 | Katzman et al. | 371/9 |

FOREIGN PATENT DOCUMENTS 0187523 7/1986 Netherlands .
2068690 8/1981 United Kingdom .

Primary Examiner—Michael R. Fleming
Assistant Examiner—Gopal C. Ray
Attorney, Agent, or Firm—Wilbert Hawk, Jr.; Albert L. Sessler, Jr.; George J. Muckenthaler

[57] ABSTRACT

A communication system uses a two-wire circuit and includes a master terminal and a backup terminal, and a main file and a backup file along with associated link control devices coupled to a plurality of satellite terminals. Each link control device functions both as a monitor and as a communication controller with priority between the link control devices for each of the files and terminals to maintain operation of the system.

10 Claims, 3 Drawing Sheets

LINK CONTROL SYSTEM COMMUNICATING BETWEEN TERMINALS

CROSS-REFERENCE TO RELATED APPLICATIONS

File Control System, Ser. No. 316,271, filed Feb. 27, 1989 invented by Mikihiko Sugiyama, Hiromi Yamamoto, and Jincheng Yang and assigned to NCR Corporation.

File Backup System, Ser. No. 316,272, filed Feb. 27, 1989 invented by Jiro Naito and Fumio Ito and assigned to NCR Corporation.

BACKGROUND OF THE INVENTION

In the field of data processing, the use of point of sale (POS) terminals has required and also has enabled rapid and accurate transfer of information from one location to another in a business operation. In the case of department stores, the sales data must be transmitted or communicated from one or more terminals throughout the store to a central computer or processing unit.

A filing system is used to provide and maintain inventory and price data on the huge number of items that are sold in the store. The filing system and the control therefor provide means for retrieving and updating data and information regarding the constantly changing inventory and prices for the overall operation. The control for the POS system requires a means for controlling a line or circuit that carries data communication among individual terminals.

Representative documentation in the field of link control systems includes Japanese Patent Specification #659/88 which discloses a plurality of controllers and terminals connected together by use of an automatic line switcher. When a disorder occurs in a controller, the line switcher automatically switches the line to connect the terminal to another controller.

U.S. Pat. No. 4,366,535, issued to R. Cedolin et al. on Dec. 28, 1982, discloses a modular signal-processing system with a pair of identical microprocessors operating in parallel, one microprocessor being enabled to transmit messages while the other operates as a dummy. The two processors are interlinked by a connection enabling verification of correct operation under control of a common clock.

U.S. Pat. No. 4,468,750, issued to M. E. Chamoff et al. on Aug. 28, 1984, discloses a system of smart terminals and a dumb controller coupled by means of a communications link. Each of the terminals has a programmable digital processor, entry devices and display devices.

U.S. Pat. No. 4,502,120, issued to S. Ohnishi et al. on Feb. 26, 1985, discloses a system for data transmission between slave cash registers and a master register wherein a transmitting device divides the data into parts and the capacity of a receiving device is identical with the capacity of a memory device.

U.S. Pat. No. 4,626,844, issued to B. L. Mann et al. on Dec. 2, 1986, discloses an addressable electronic switch capable of series connection with a host computer and other peripheral devices. The switch circuit detects presence of an individual access code within the data stream and retransmits all data except its own access code.

In a conventional POS system, it is seen that when a communication control device, which is provided in a controller such as a master terminal or the like, is out of order and cannot control the communication of data, the line control is switched manually or is switched automatically by a line switcher. This method is used in a system which includes a backup master terminal that includes a communication control device that can be switched into the system and control the communication of data and thereby avoid down time of the system by reason of failure of a communication control device. The line switcher includes disorder detecting means for detecting disorder in the controller and switches the line so as to connect the terminal to another controller.

The above-mentioned manual line switching arrangement has a disadvantage in that the data communication among the terminals cannot be performed unless the operator finds the disorder and initiates action to effect or exercise switching the line. Additionally, the invention disclosed in the above-mentioned Japanese Specification has a problem in that the controllers and terminals are connected together through the line switcher, so that when the line switcher is out of order, the line cannot be successfully connected or controlled and data communication between the controllers and the terminals cannot be performed.

Further, a conventional POS system generally uses a four wire line or circuit. The use of the four wire line has a problem that in case the communication controlling operation is switched from the master terminal to the backup master terminal, it is necessary to switch the line connection between the receiver and the transmitter of the backup master terminal and a certain type line switcher is required in the operation.

SUMMARY OF THE INVENTION

The present invention relates to a link control system for controlling a line or circuit for data communication among individual terminals in a point of sale (POS) system. The link control system is constructed such that a two-wire line or circuit is employed and link control devices are respectively provided in the main file devices and have the capability of controlling the entire system. Each of the link control devices continually monitors the line or circuit and when an abnormal condition or disorder in communication is detected, one of the link control devices having the highest priority at that time takes over and controls the line or circuit.

In accordance with the present invention, there is provided a link control system for use in a POS system comprising a plurality of link control devices each having line control means for controlling transmitting and receiving of data from other devices in accordance with requests for data from POS terminals, line monitor means for monitoring the state or condition of the line in accordance with data appearing on the line and for sending an out-of-order detecting signal upon detecting an abnormality on the line, confirmation requesting means for sending a request signal to other link control devices to confirm priority in response to the out-of-order detecting signal from the line monitoring means, and priority judging means for confirming priority in response to the out-of-order detecting signal from the line monitoring means or the request to confirm the priority signal from other link control devices to send a link control signal to the line control means when the line control means is given the highest priority, the line control means being constructed to control the line over the entire system in response to the link control signal from the priority judging means.

In view of the above discussion, a principal object of the present invention is to provide a link control system in a POS system without the need for a line switching operation.

Another object of the present invention is to provide a link control system wherein an alternative link control device automatically controls the data communication when one link control device is down.

An additional object of the present invention is to provide a link control system wherein the line or circuit connecting the terminals is continually monitored for out-of-order conditions.

A further object of the present invention is to provide a link control system wherein link control devices are provided to control the POS system and wherein each of the link control devices monitors the communication line. When an abnormality is detected on the line, the device with the highest priority controls the line to maintain the system in operation.

Additional advantages and features of the present invention will become apparent and fully understood from a reading of the following description taken together with the annexed drawing.

DESCRIPTION OF THE PREFERRED EMBODIMENT

Figure 1:
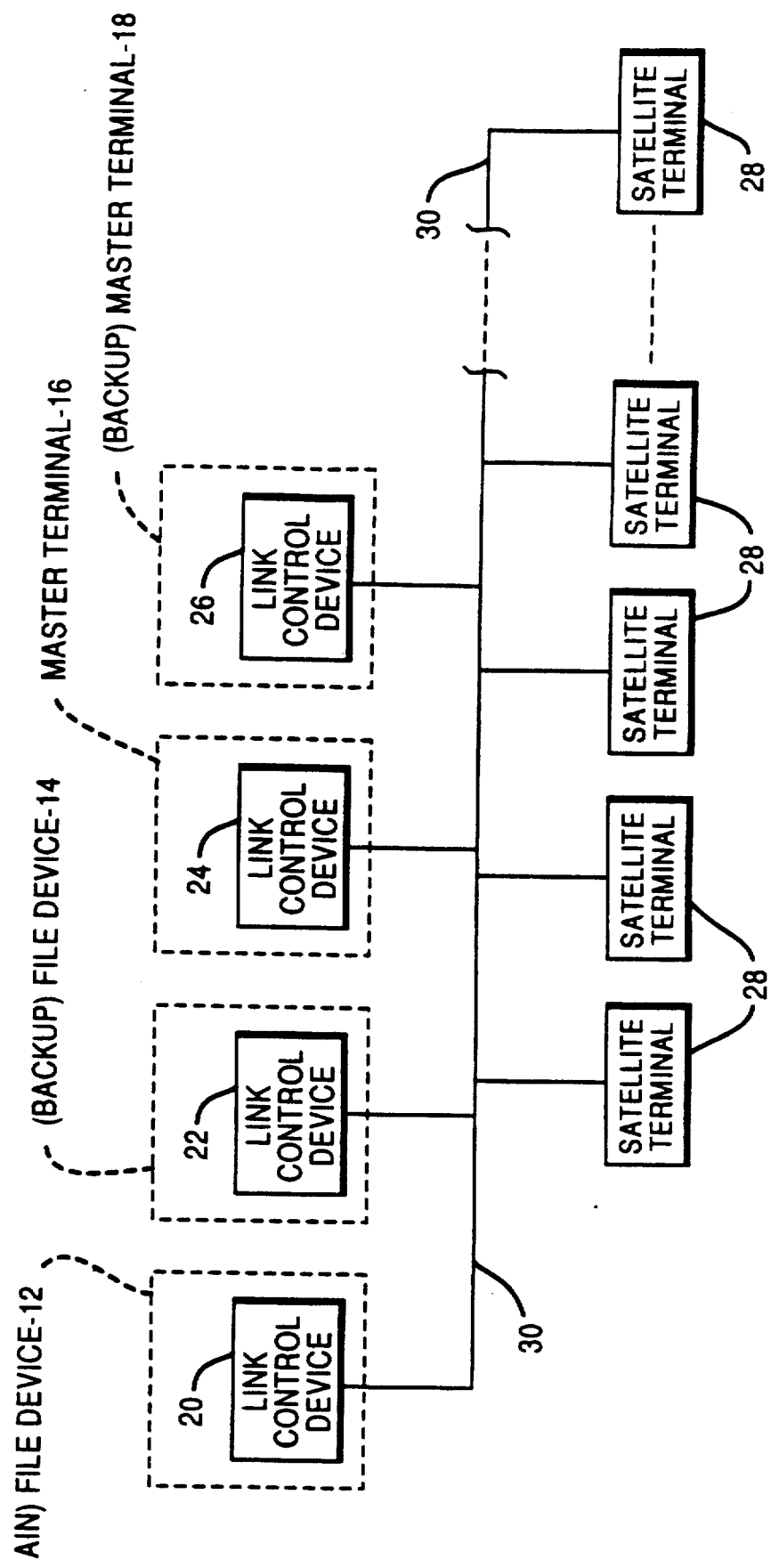
FIG. 1 is a block diagram showing the structure of the link control system for use in a POS system according to a preferred embodiment of the present invention.

FIG. 1 is a diagram showing a preferred embodiment of a POS system in which the link control system of the present invention is employed. A plurality of main terminals 12, 14, 16 and 18 are provided in the POS system. A plurality of link control devices 20, 22, 24 and 26 are respectively provided within the main terminals 12, 14, 16 and 18 of the POS system. The main terminals consist of and are described as a main file device 12, a backup file device 14, a master terminal 16, and a backup master terminal 18. It is not always necessary to provide the link control devices 20, 24, 26 and 28 in all the respective main terminals 12, 14, 16 and 18 and the number of the link control devices can be increased or decreased as required. For example, it may not be necessary to provide a link control device in the backup master terminal 18. The link control devices 20, 24, 26 and 28 are different from one another in ranking of priority. Although the highest ranking of priority is generally offered to the link control device 20 in the main file device 12, the priority ranking can be appropriately changed as required. In the preferred embodiment, the ranking of priority follows the order of the link control devices from 20 to 22 to 24 to 26.

Assuming that all the link control devices 20, 22, 24 and 26 are in normal operation, the link control device 20 of the highest priority controls the data communication within the system. The link control device 20 polls a plurality of individual satellite terminals 28 in a predetermined cycle and receives/transmits data from/to a satellite terminal 28 from which a request to transmit/receive data is received. In general, the polling is performed on any one of the terminals 14, 16, 18 and 20 at a rate of one time per 100 milliseconds, so that as long as the link control device 20 is in the normal operation, data should appear on a line or circuit 30 at least one time per 100 milliseconds. The link control device 20 which performs the polling operation is referred to as a primary device. The receiving/transmitting of data by polling operation of the primary device 20 is well known in the art and hence the description thereof is omitted from this specification.

The link control devices 22, 24 and 26 (each hereinafter referred to as a secondary device), other than the primary device 20, always monitor the line 30 to determine whether or not the primary device is in good order as well as responding to the polling from the primary device.

Figure 2:
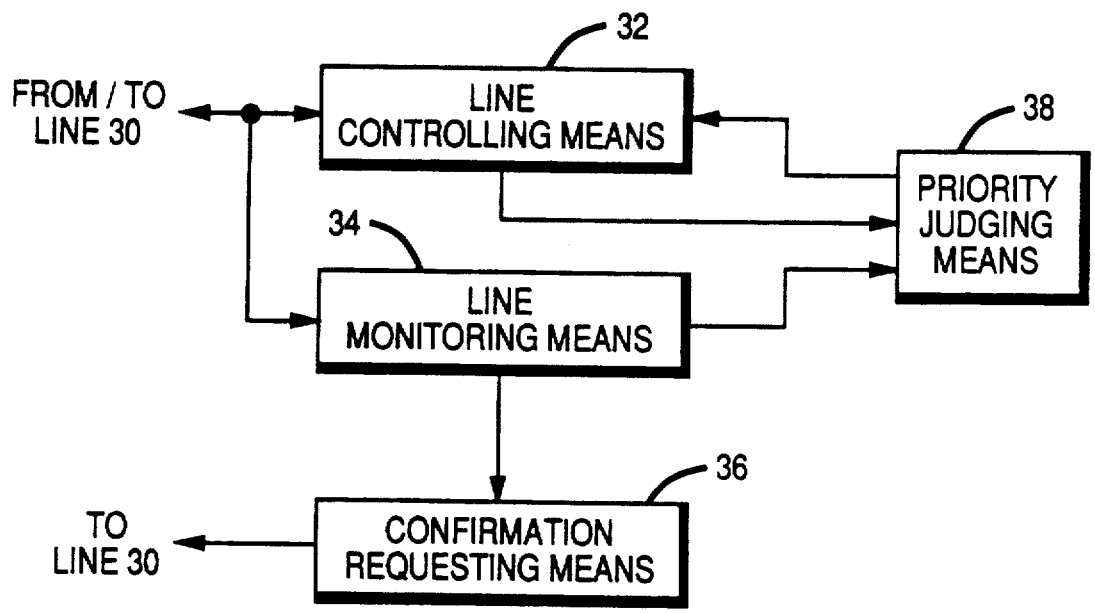
FIG. 2 is a block diagram illustrating the principle of the link control device.

Next, the case wherein the primary device 20 is out of order will be described with reference to FIGS. 1 and 2. FIG. 1 is a diagram of the link control system and FIG. 2 is a block diagram of the principle of the link control devices 20, 22, 24 and 26. A line controlling means 32 (FIG. 2) is provided for controlling the line 30 for polling operation of the primary device 20 or for responding to the polling from the primary device, as well as for responding to the polling from the secondary device. A confirmation requesting means 36 is provided for sending out a request to confirm the priority signal to the secondary devices 22, 24 and 26 when a line monitoring means 34 detects the failure of the line 30. A priority judging means 38 is provided for judging whether or not the device 20 can act as a primary device when the line monitoring means 34 detects the failure of the line 30 and a request to confirm the priority is made from a secondary device 22, 24 or 26.

The line monitoring means 34 checks to see whether or not data appears on the line 30 within a predetermined period of time, for example, 500 milliseconds. In the normal operation, the primary device 20 must poll any one of the terminals 14, 16, 18 or 28 (FIG. 1) at least one time per 100 milliseconds and hence data must appear on the line 30 at least one time per 100 milliseconds. In case the primary device 20 is out of order, no polling operation is performed, so that no data appears on the line 30 and hence the line monitoring means 34 detects the failure of the line. Assuming that the secondary device 24 detects the failure of the line 30, the line monitoring means 34 of such secondary device 24 will send a failure detection signal to the confirmation requesting means 36 and to the priority judging means 38. The confirmation requesting means 36 then sends a request to confirm the priority signal to the other secondary devices 22 and 26 via the line 30. The priority judging means 38 judges whether or not the secondary device of its own is at the highest ranking of priority among the now working secondary devices 22, 24 and 26. The secondary device 24 is at the priority ranking lower than that of the secondary device 22 and hence cannot act as the primary device.

The secondary devices 22 and 26 receive the request to confirm the priority signal from the secondary device 24 by the line controlling means 32 (FIG. 2) of their own and send the signals thus received to the priority judging means 38 of their own which, then, judge the ranking of priority of their own simultaneously with the judging operation of the secondary device 24. The secondary device 26 cannot act as the primary device due to the presence of the secondary devices 22 and 24 at the higher ranking of priority. The priority judging means 38 of the secondary device 26 confirms that the secondary device 22 is at the highest ranking of priority to thus send a link control signal to the line controlling means 32. When the line controlling means 32 receives the link control signal, the secondary device 22 can act as the primary device to start the polling operation. Each of the link control devices 20, 22, 24 and 26 (FIG. 1) includes a central processing unit (CPU), a read only memory (ROM), a random access memory (RAM), and other necessary control circuits (not shown).

Figure 3:
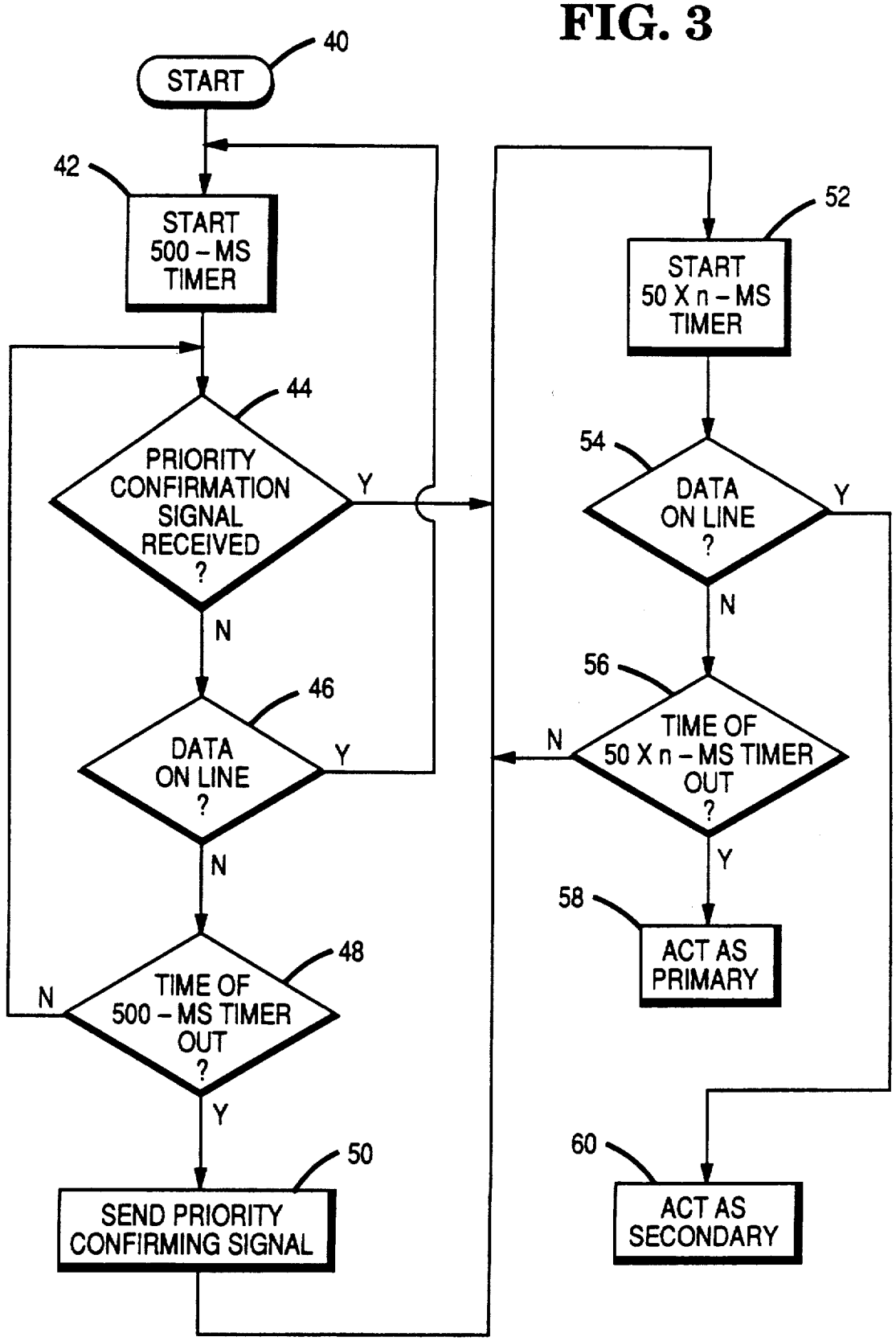
FIG. 3 is a flow chart illustrating the recovering operation of the system.

FIG. 3 is a flow chart illustrating the restoring or recovering operation performed by the secondary device for the line control in case the primary device is down. The process steps in blocks 42, 44, 46 and 48 in FIG. 3 are steps for the operation of the line monitoring means 34 in FIG. 2. The process step in block 50 is for the operation of the confirmation controlling means 36, the process steps in blocks 52, 54 and 56 are for the operation of the priority judging means 38, and the process steps in blocks 58 and 60 are for the operation of the line controlling means 32. Each of the link control devices 20, 22, 24 and 26 is constructed in the same manner except for their priority ranking. In view of this same construction, only the secondary device 24 will be described in detail.

The secondary device 24 starts (block 40) a 500 millisecond timer (block 42) and then continually checks to see whether or not a request to confirm the priority is sent out from any of the remaining secondary devices 22 or 26 (block 44) and whether or not data appears on the line 30 (block 46). When the request to confirm the priority is sent from the above-mentioned secondary device 24 (block 44), the secondary device 22 goes to the operation indicated in the process step represented by block 52. On the other hand, when no request to confirm the priority is received and no data appears on the line 30, the secondary device 24 goes to the process step represented by block 48 to check whether or not the time of the 500 millisecond timer is timed out and, if not, returns to block 42 to repeat the same procedure. In the normal operation of the primary device, as 20, the polling operation is performed in a cycle shorter than 500 milliseconds, so that the data appears on the line 30 before the time of the 500 millisecond timer is timed out. When the secondary device, as 24, detects the appearance of the data on the line 30 in block 46, the process returns to block 42 to re-start the 500 millisecond timer to repeat the same procedures (blocks 42-48).

Now, assuming that the primary device 20 is down, the time of the 500 millisecond timer is timed out in block 48 and the secondary device 24 goes to block 50 wherein the request to confirm the priority signal is sent to the other secondary devices 22 and 26. Then, the secondary device 24 goes to block 52 to start a 50×n (a predetermined priority ranking of its own) millisecond timer and to check whether or not the data appears on the line 30 (block 54). The other secondary devices 22 and 26 receive the request to confirm the priority signals from the secondary device 24 in block 44 to start their 50×n millisecond timers. Then, the secondary devices 22, 24 and 26 check to see whether or not the times of the 50×n millisecond timers are timed out (block 56). Now, the secondary devices 22, 24 and 26 are respectively at the second, third and fourth priority rankings, so that the timers are respectively set to 50×2=100 milliseconds, 50×3=150 milliseconds and 50×4=200 milliseconds in that order starting from the secondary device 22. Accordingly, the time of the timer of the secondary device 22 is first timed out, so that the secondary device 22 goes to block 58 to act as the primary device, whereupon the line controlling means 32 of the secondary device 22 starts the polling operation. When the secondary device 22 starts the polling operation, the data appears on the line 30, so that the secondary devices 24 and 26 detect the data on the line 30 in block 54 and go to block 60 to keep on monitoring the line as secondary devices.

Figure 4:
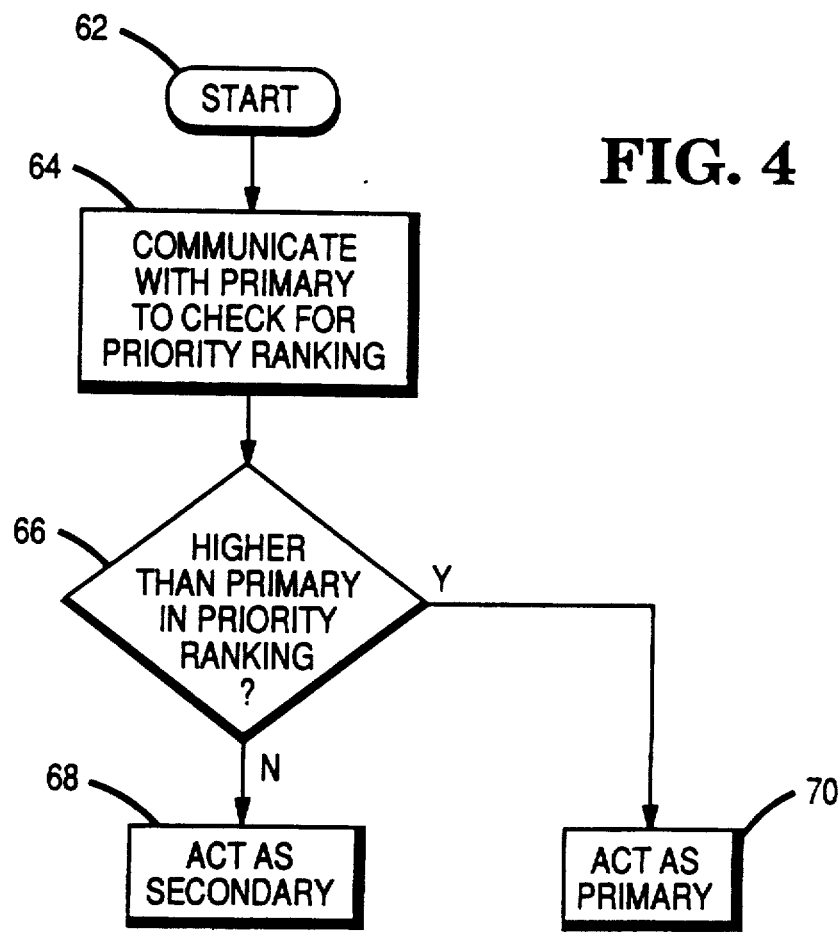
FIG. 4 is a flow chart illustrating the restoring operation of the link control device which has been repaired.

Next, the operation to be performed by a damaged link control device after it has been repaired and restored to the system under normal operation will be described with reference to FIG. 4. It is assumed that the link control device 20 has been repaired and restored to the system (block 62). The link control device 20, when polled from the primary device 22, communicates with such primary device 22 to confirm the priority ranking of the primary device 22 (block 64) and to check whether device 20 is higher than the primary device 22 in priority ranking (block 66). Now, the link control device 20 is higher in priority ranking than the primary device 22, so that the primary device 22 transfers the right of the primary device to the link control device 20, wherein the primary device 22 acts as the secondary device (block 68). If the link control device 20 is higher in priority, the link control device 20 acts as the primary device (block 70). Even if the damaged link control device 26 has been restored after being repaired, the link control device 26 is lower in priority ranking than the primary device 22, so that device 26 acts as the secondary device. Accordingly, a link control device which is the highest in priority ranking of the link control devices under operation can control the line 30 of the overall system.

As has been described above, the present invention is constructed such that a plurality of link control devices 20, 22, 24 and 26 are provided on a line or circuit 30 such that when one link control device is damaged, another link control device of the second or next priority ranking can automatically control the line 30. In this regard, a stable link control system which requires no line switcher and which will not be down if a link control device is damaged can be constructed and maintained.

It is thus seen that herein shown and described is a link control system that enables rapid response to requests from terminals. When one of the link control devices has failed or is down, another link control device becomes the primary device and maintains the system in operation. The structure and arrangement enable the accomplishment of the objects and advantages mentioned above, and while a preferred embodiment of the invention has been disclosed herein, variations thereof may occur to those skilled in the art. It is contemplated that all such variations not departing from the spirit and scope of the invention hereof are to be construed in accordance with the following claims.

What is claimed is:

1. A link control system for use in communicating over a line with a plurality of point of sale terminals comprising a plurality of link control devices having a predetermined ranking of priority, each of said devices including line controlling means for controlling transmitting and receiving of data from other link control devices in accordance with requests for data from at least one of said terminals, line monitoring means for continually monitoring the state of the line in accordance with data appearing on the line within a predetermined period of time and for sending an out-of-order detecting signal upon detecting abnormalities on said line, confirmation requesting means coupled with said line monitoring means for sending a request signal to other link control devices to confirm priority in response to receipt of said out-of-order detecting signal from said line monitoring means, and priority judging means coupled with said line monitoring means and with said line controlling means for judging and for confirming ranking of priority in response to receipt of the out-of-order detecting signal from said line monitoring means or the request to confirm the priority signal from other link control devices to send a link control signal to said line controlling means of the respective link control device when said line controlling means is given the highest priority, said line controlling means being constructed to control the line over the entire system in response to said link control signal from said priority judging means.

2. The link control system of claim 1 wherein one of said link control devices operates as the primary device by reason of having higher priority than the remaining link control devices.

3. The link control system of claim 1 wherein one of said link control devices having a lower priority operates as the primary device when a link control device having a higher priority is down or has failed in operation.

4. The link control system of claim 1 including timing means operably associated with each of the link control devices and set for timing out in accordance with respective priorities.

5. In a point of sale system for data communication among a plurality of terminal devices over a two-wire line connecting the terminal devices, a link control system having a plurality of link control devices of different priorities, the improvement comprising an arrangement for automatically controlling communication among said terminal devices wherein each of said link control devices includes line controlling means for controlling data transmission and reception from other link control devices on said line in accordance with a request for data from at least one of said terminal devices, line monitoring means for monitoring the condition of the line in accordance with data appearing on said line within a predetermined period of time and for sending a detecting signal upon detecting an out-of-order condition on said line, confirmation requesting means coupled with said line monitoring means for sending a request signal to the link control devices to confirm priority in response to receipt of the out-of-order detecting signal from said line monitoring means, and priority judging means coupled with said line monitoring means and with said line controlling means for judging and for confirming the ranking of priority of a link control device in response to receipt of the out-of-order detecting signals from said line monitoring means or the request to confirm the priority signal from the other link control devices to send a link control signal to said line controlling means of the respective link control device when such line controlling means is given the highest priority, said line controlling means being constructed to control the line over the entire system in response to said link control signal from said priority judging means.

6. In the point of sale system of claim 5 wherein one of said link control devices operates as the primary device by reason of having higher priority than the remaining link control devices.

7. In the point of sale system of claim 5 wherein one of the link control devices having a lower priority operates as the primary device when a link control device having a higher priority is down or has failed in operation.

8. In the point of sale system of claim 5 including timing means operably associated with each of the link control devices and set for timing out in accordance with respective priorities.

9. A method for controlling flow of communication data among a plurality of terminals over a line connecting said terminals by use of a link control system having a plurality of link control devices of different priorities comprising the steps of:

providing line controlling means for each link control device for controlling data transmission and data reception among said plurality of terminals in accordance with a request for data from at least one of said terminals, providing line monitoring means for each link control device for continually monitoring the condition of the line in accordance with data appearing on the line within a predetermined period of time, sending a detecting signal by said line monitoring means upon detecting an out-of-order condition on said line, providing confirmation requesting means for each link control device for sending a request signal to the link control devices and for confirming the priority of said link control devices in response to receipt of the out-of-order detecting signal, and providing priority judging means for each link control device for judging and for confirming the ranking of priority of the link control devices in response to receipt of the detecting signal from the monitoring of the line or the request signal from said confirmation requesting means confirming the priority of the link control devices, and said priority judging means sending a link control signal to the line controlling means of the link control device having the highest priority for controlling the communication of data over the link control system.

10. The method of claim 9 including the step of timing the operation of the link control devices in accordance with a priority of each device.

* * * * *